(12) United States Patent
Oka

(10) Patent No.: US 12,531,971 B2
(45) Date of Patent: Jan. 20, 2026

(54) MONITORING APPARATUS, MOVABLE APPARATUS, AND INSTALLATION METHOD FOR MONITORING APPARATUS

(71) Applicant: CANON KABUSHIKI KAISHA, Tokyo (JP)

(72) Inventor: Nobuhiro Oka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/773,837

(22) Filed: Jul. 16, 2024

(65) Prior Publication Data
US 2025/0039349 A1  Jan. 30, 2025

(30) Foreign Application Priority Data

Jul. 27, 2023 (JP) ................. 2023-122327

(51) Int. Cl.
*H04N 13/156* (2018.01)
*H04N 23/611* (2023.01)
*H04N 23/698* (2023.01)
*H04N 13/00* (2018.01)

(52) U.S. Cl.
CPC ......... *H04N 13/156* (2018.05); *H04N 23/611* (2023.01); *H04N 23/698* (2023.01); *H04N 2013/0085* (2013.01)

(58) Field of Classification Search
None
See application file for complete search history.

(56) References Cited

U.S. PATENT DOCUMENTS

| 2016/0094808 A1* | 3/2016 | Cerri ................... B60R 1/27 348/36 |
| 2018/0160097 A1* | 6/2018 | Weng ................. H04N 13/239 |
| 2021/0231926 A1* | 7/2021 | Dallaire ................. G02B 9/62 |
| 2023/0156326 A1* | 5/2023 | Funatsu ............ H04N 23/632 348/220.1 |

FOREIGN PATENT DOCUMENTS

JP 7189620 B2 12/2022

* cited by examiner

*Primary Examiner* — Eileen M Adams
(74) *Attorney, Agent, or Firm* — Carter, DeLuca & Farrell LLP

(57) ABSTRACT

A monitoring apparatus has a first image capturing unit and a second image capturing unit. Each of the first image capturing unit and the second image capturing unit is provided with an image capturing element, and an optical system configured to form an optical image on a light receiving surface of the image capturing element at an ultrawide angle viewing angle in which a resolution of a second region that is on an outer peripheral side of a first region is higher in comparison to a resolution of the first region that includes a center through which an optical axis passes. In addition, the first image capturing unit and the second image capturing unit are disposed such that t directions of the optical axes of the optical systems are opposite to each other.

12 Claims, 5 Drawing Sheets

MONITORING APPARATUS, MOVABLE APPARATUS, AND INSTALLATION METHOD FOR MONITORING APPARATUS

BACKGROUND OF THE INVENTION

Field of the Invention

The present disclosure relates to a monitoring apparatus, a movable apparatus, and an installation method for a monitoring apparatus.

Description of the Related Art

Conventionally, movable apparatuses that move autonomously in various locations such as homes, office buildings, distribution centers, and the like, are known. Such a movable apparatus can perform autonomous travel by acquiring the surrounding state from output information from a sensor that has been built into the movable apparatus itself.

For example, Japanese Patent No. 7189620 discloses a technology that uses captured images (omnidirectional images) that are acquired by an omnidirectional camera that has been provided to an autonomous travel type robot inside of a house, and recognizes objects inside of this house. This omnidirectional image is, for example, configured by an upper omnidirectional image and a lower omnidirectional image.

However, in the prior art that has been disclosed in the above-described Japanese Patent No. 7189620, the direction in which the majority of the objects exist is not taken into consideration. Therefore, in the captured images, there are cases in which the region (resolution) for objects that are not the primary image capturing subject are larger than necessary, or in which the region (resolution) for the object that is the primary image capturing subject is not sufficient. In such cases, there is a possibility that the size efficiency and the usage efficiency of the captured image data will become poor.

SUMMARY OF THE INVENTION

In this context, the present disclosure provides a technology that is able to capture high resolution images of a region in a direction in which objects that are the image capturing subjects primarily exist within the image capturing angle of view.

A monitoring apparatus according to one embodiment of the present disclosure comprises: a first image capturing unit and a second image capturing unit, wherein each of the first image capturing unit and the second image capturing unit comprises an image capturing element, and an optical system configured to form an optical image on a light receiving surface of the image capturing element at an ultrawide-angle viewing angle in which a resolution of a second region that is on the outer peripheral side of a first region is larger in comparison to a resolution of the first region that includes a center through which an optical axis passes. The first image capturing unit and the second image capturing unit are disposed such that directions of the optical axes of the optical systems are opposite to each other.

Further features of the present disclosure will become apparent from the following description of exemplary embodiments (with reference to the attached drawings).

DESCRIPTION OF THE EMBODIMENTS

Figure 1:
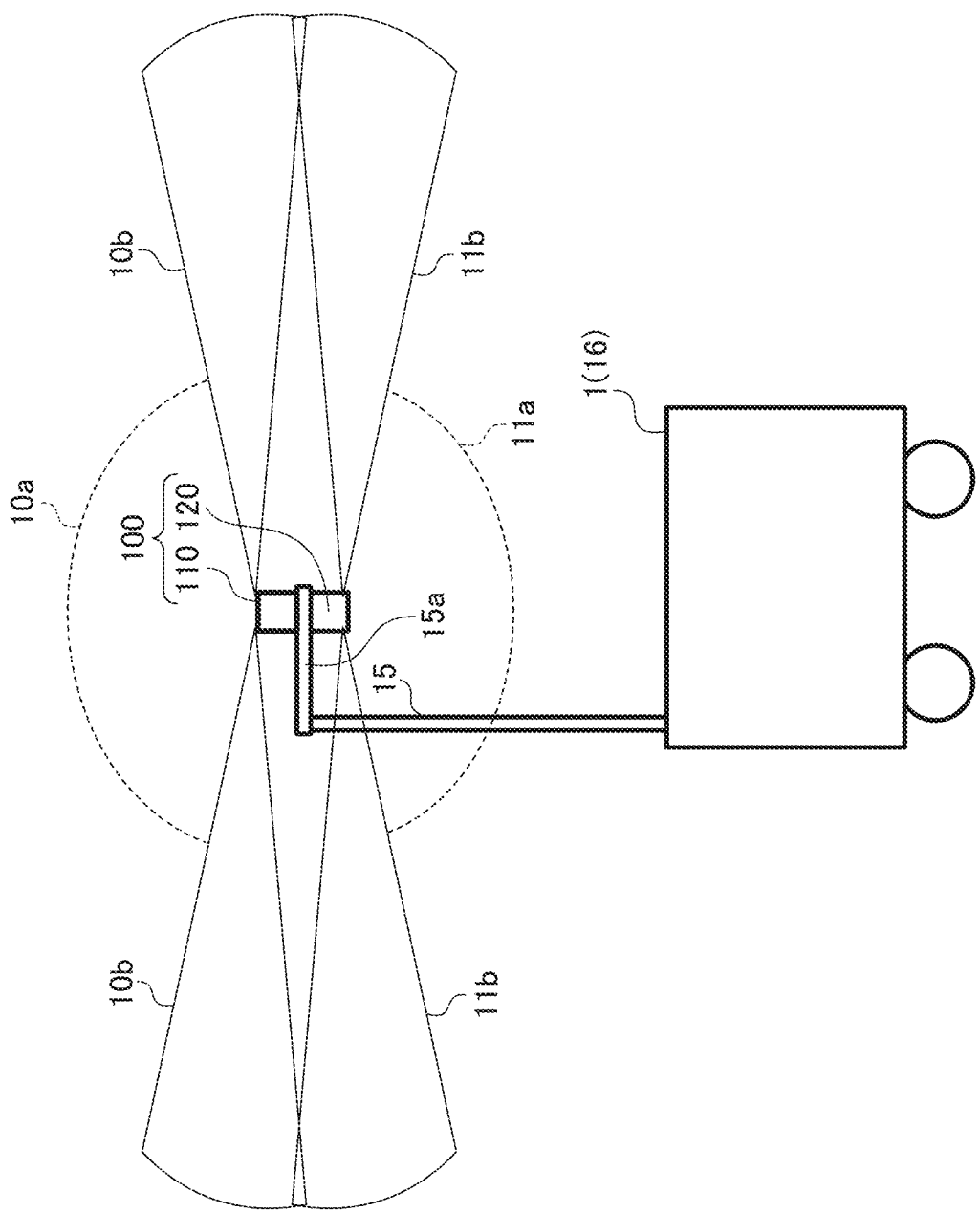
FIG. 1 is a schematic diagram showing a movable apparatus with a built-in monitoring apparatus according to the present embodiment.

Below, embodiments of the present disclosure will be explained with reference to the attached drawings. In the drawings, articles having the same configurations or functions have been assigned the same reference numbers, and repetitive explanations thereof are omitted. The configurations that are shown in the following embodiments are simply one example, and the present disclosure is not limited to the configurations that have been shown in the drawings.

FIG. 1 is a schematic diagram showing a movable apparatus 1 that has a built-in monitoring apparatus 100 according to the present embodiment. The movable apparatus 1 is, for example, a movable robot such as an AMR (autonomous mobile robot), or an AGV (automated guided vehicle), or the like. The movable apparatus 1 according to the present apparatus can be used, especially within a home, as a robot that monitors the state of its surroundings while assisting the movement of a person such as setting a table, carrying furniture or objects, or the like.

A support unit 15 is provided on a main body 16 of the movable apparatus 1, and a monitoring apparatus 100 is supported by the support unit 15. The monitoring apparatus 100 may also be configured so as to be able to be detached from the movable apparatus 1 by a user. The monitoring apparatus 100 is provided with an image capturing unit 110 (a first image capturing unit) and an image capturing unit 120 (a second image capturing unit).

The image capturing unit 110 is installed in a first position such that the optical axis of the optical system provided with the image capturing unit 110 points upward direction. The upward direction is, for example, the direction of the sky or a ceiling. The image capturing unit 120 is installed in a second position such that the optical axis of the optical system provided with the image capturing unit 120 points downward direction which is the opposing direction of the optical axis of the image capturing unit 110. The downward direction is, for example, the direction of the ground or a floor.

That is, the image capturing unit 110 and the image capturing unit 120 are disposed such that directions of the optical axes of their respective optical systems are opposite to each other. The directions of optical axes are opposite to each other means that, for example, the angle between each optical axis is approximately 180°. Approximately 180° means in the vicinity of 180°, and is shown by, for example, 180°±α (for example, α=0° to 10°, or the like). Such a placement of the image capturing unit 110 and the image capturing unit 120 can also be described using the following different expression. It can be said that the image capturing unit 110 is disposed so as to capture images of a visual field range in a first direction, and the image capturing unit 120 is disposed in the opposite direction of the image capturing unit 110 so as to capture images of a visual field range in a second direction that opposes the first direction.

The optical axis of the image capturing unit 110 and the optical axis of the image capturing unit 120 are on the same straight line. By installing the image capturing unit 110 and the image capturing unit 120 in this manner, it is possible to reduce position misplacement between images when an image synthesizing unit 105 to be described below (FIG. 3) is synthesizing the captured images from the image capturing unit 110 and the image capturing unit 120.

It is preferable that the image capturing unit 110 and the image capturing unit 120 are installed to be as adjacent as possible in the vertical direction, and that their installation positions are at approximately the same height. That is, it is preferable if the first position and the second position are adjacent. By installing the image capturing unit 110 and the image capturing unit 120 in this manner, it becomes possible to also capture images in a range of the lateral direction that is adjacent to the monitoring apparatus 100, and it is possible to decrease blind spots.

Note that in the example that is shown in FIG. 1, the image capturing unit 110 and the image capturing unit 120 are installed to be adjacent by being attached to an attachment unit 15a that has been provided on the tip of the support unit 15 such that they sandwich the attachment unit 15a. However, the present disclosure is not limited to such a mode, and the image capturing unit 110 and the image capturing unit 120 may also be supported by being directly connected. The term "adjacent" also includes a meaning in which the image capturing unit 110 and the image capturing unit 120 are directly connected in this manner.

Aside from being installed to face in opposite directions, the image capturing unit 110 and the image capturing unit 120 have substantially identical configurations. Therefore, below a configuration of the image capturing unit 110 will be explained as an example.

As will be explained below in FIG. 3, the image capturing unit 110 has an optical system 113, and an image capturing element 115. The optical system 113 has an ultrawide-angle viewing angle. The term ultrawide-angle indicates a viewing angle that is, for example, at or above 180°. The lower limit value is not limited to 180°, and may also be an arbitrary angle that is equal to or greater than 180° (180°, 185°, 190°, 195°, 2000°, or the like).

The optical system 113 of the image capturing unit 110 in the present embodiment generates an optical image (image circle) having a characteristic in which the resolution in a second region that is on the outer peripheral side of a first region is high in comparison to the resolution of the first region which includes a center through which the optical axis passes, and forms an image on the image capturing element 115. The optical system 113 is an optical system for which the image forming magnification is different for a first angle of view 10a and a second angle of view 10b that is on the outer peripheral side of the first angle of view 10a. This will be explained in detail below using FIG. 2A and FIG. 2B.

Note that the image capturing surface (light receiving surface) of the image capturing element 115 comprises a first image capturing region in which images are captured of objects that are included in the first angle of view 10a, and a second image capturing region in which images are captured of objects that are included in the second angle of view 10b. The pixel number per unit angle of view in the second region is larger than the pixel number per unit angle of view in the first image capturing region. In other words, the resolution of the second image capturing region corresponding to the second angle of view in the image capturing unit 110 is higher than the resolution for the first image capturing region corresponding to the first angle of view.

An angle of view in which the first angle of view 10a and the second angle of view 10b have been combined corresponds to the image capturing angle of view of the image capturing unit 110. However, this image capturing angle of view (corresponding to the viewing angle of the optical system 113) is equal to or great than 180° as was explained above. The image capturing angle of the view of the image capturing unit 120 is also equal to or greater than 180° in the same manner, and therefore, the image capturing angle of view of the image capturing unit 110 and the image capturing angle of view of the image capturing unit 120 overlap in the peripheral area. Therefore, it is possible to perform wide range (in the present embodiment, 360°) image capturing of the surroundings of the monitoring apparatus 100.

Figure 2:
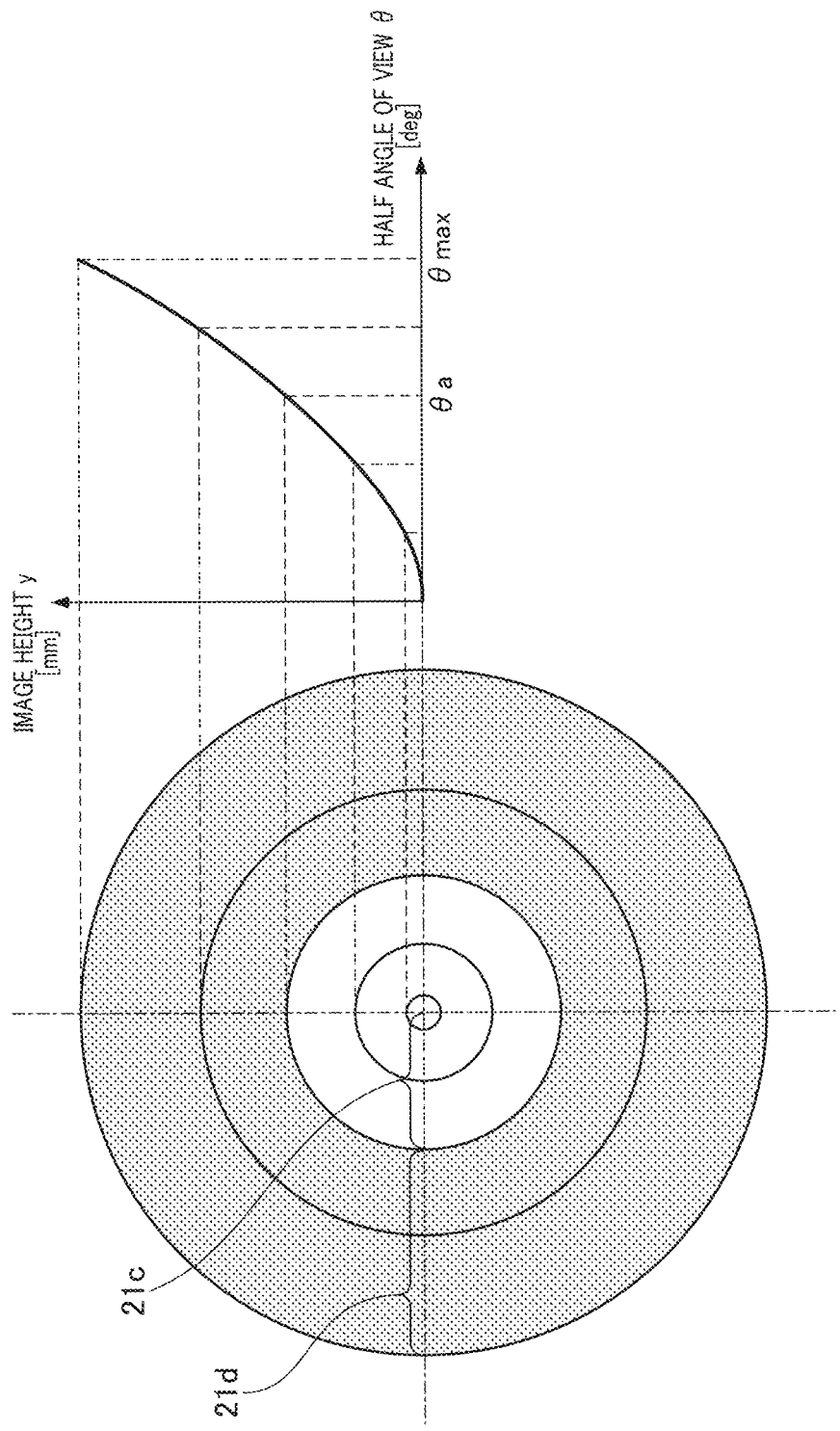
FIG. 2A, and FIG. 2B are diagrams showing the optical properties of the optical systems of the monitoring apparatus.

In this context, the optical characteristics of the optical system 113 of the image capturing unit 110 will be explained with reference to FIG. 2A and FIG. 2B. FIG. 2A is a diagram showing an image height y, which occurs in each half angle of view on the image capturing surface (light receiving surface) of the image capturing element 115 of the optical system 113, as a contour line. FIG. 2B is a graph showing the projection characteristic of the optical system 113 and shows the relationship between a half angle of view $\theta$ and the image height y in a first quadrant of FIG. 2A.

As is shown in FIG. 2B, the optical system 113 is configured such that the projection characteristic ($\theta$) for the optical system 113 is different at an angle of view that is less than a predetermined half angle of view $\theta a$ and an angle of view that is equal or greater to the half angle $\theta a$. Therefore, the optical system 113 is configured such that when the increase amount for the image height y corresponding to the half angle of view $\theta$ per unit (per unit angle of view in the half angle of view $\theta$) is made the resolution, this resolution is different based on the angle of view (the region on the light receiving surface of the image capturing element 115). This local resolution can be expressed by the differential value $dy(\theta)/d\theta$ at the half angle of view $\theta$ of the projection characteristic y ($\theta$). For example, it can be said that the larger the slope of the projection characteristic y ($\theta$) is in FIG. 2B, the higher the resolution will be. In addition, in FIG. 2A, it is shown that the larger the intervals between the contour lines for the image height y in each half angle of view are, the higher the resolution will be.

That is, the optical system 113 has a projection characteristic in which the rate of increase for the image height y (the slope of the projection characteristic y ($\theta$) in FIG. 2B) in the region around the center of the optical axis vicinity is small, and the rate of increase for the image height y becomes larger in accordance with the angle of view in the peripheral regions becoming larger.

In FIG. 2A, the first region 21c that includes the center of the optical system 113 corresponds to an angle of view that is less than the half angle of view $\theta a$, and the second region 21d on the outside of the first region 21c corresponds to an angle of view that is equal to or greater than the half angle of view $\theta a$. In addition, the angle of view that is less than the half angle of view $\theta a$ corresponds to the first angle of view 10a in FIG. 1, and the angle of view that is equal to or greater than the half angle of view $\theta a$ corresponds to the second angle of view 10b in FIG. 1. In the same manner, the angle of view that is less than the half angle of view $\theta a$ of the optical system 123 of the image capturing unit 120 corresponds to the angle of view 11a in FIG. 1, and the angle of view that is equal to or greater than the half angle of view $\theta a$ corresponds to the angle of view 11b in FIG. 1.

As was explained above, the first region 21c is a region with a comparatively low resolution, and the second region 21d is a region with a comparatively high resolution.

The characteristics that are shown in FIG. 2A and FIG. 2B are one example, and the present disclosure is not limited thereto. For example, the low-resolution region and the high-resolution region of the optical system do not need to be configured in concentric circles, and the shapes of both these regions may also be distorted. In addition, the center of the low-resolution region and the center of the high-resolution region do not need to match. In addition, the center of the low-resolution region and the center of the high-resolution region may also be unaligned with the center of the light receiving surface of the image capturing element. In the optical system of the present embodiment, it is sufficient if the low-resolution region is formed so as to be in the vicinity of the optical axis, and the high-resolution region is formed so as to be on the peripheral side of the vicinity of the optical axis.

The value of the half angle of view θa can be suitably set. That is, it is not the case that there is a clear border between the first region 21c and the second region 21d. In the present embodiment, the resolution also becomes higher inside of the first region 21c following the direction from the center side through which the optical axis passes to the outer peripheral side. In addition, the same also applies to the inside of the region 21d. Conversely, with respect to the graph of the projection characteristic that is shown in FIG. 2B, at least a portion of the first region 21c and/or at least a portion of the second region 21d may also be linear (the resolution is uniform).

The optical system 113 is configured such that when the focal length is made f, the half angle of view is made θ, the image height on the image surface is made y, the projection characteristic that shows the relationship between the half angle of view θ and the image height y is made y(θ), and the greatest half angle of view had by the optical system is made θ max, the following Formula 1 is fulfilled. That is, the optical system 113 is configured such that the projection characteristic y (θ) is different from 2f tan (θ/2) (stereographic projection formula). A lens having such optical characteristics is called a reverse-different-angle-of-view lens.

$$0.2 < 2 \times f \times \tan(\theta \max/2)/y(\theta \max) < 0.92 \quad \text{(Formula 1)}$$

In an optical system that has such a reverse-different-angle-of-view characteristic, it is possible to adjust the magnification in the radiation direction from the center through which the optical axis passes by adjusting the projection characteristic y (θ). It is thereby possible to control the aspect ratio (the aspect ratio for an image that has been plane expanded) for the radiation direction and the circumferential direction of the optical axis. Therefore, the optical system 113 of the present embodiment differs from conventional fisheye lenses and the like, and it is possible to obtain a high-resolution image with little distortion in the peripheral region despite the angle of view being a wide angle.

In addition, by fulfilling the Formula 1, it is possible to make the resolution in the second region 21d higher than the resolution in an optical system with a stereographic projection formula. If the upper limit of the Formula 1 is exceeded, the resolution in the second region 21d will become low, and the difference in resolutions with the resolution in the first region 21c will become small, and this is therefore not preferable. In addition, if the lower limit of the Formula 1 is exceeded, it becomes difficult to satisfactorily correct various aberrations such as a curvature of image or the like, and this is therefore also not preferable. However, the above-described Formula 1 is one example, and the optical system of the present embodiment is not limited thereto.

By configuring the optical system in the manner that has been described above, it is possible to obtain a high degree of resolution in the high-resolution region, and in contrast, in the low-resolution region, it becomes possible to make the increase amount of the image height y in relation to the half angle of view θ per unit small, and to capture images using a wider angle of view. Therefore, it is possible to obtain a high resolution in the high-resolution region while using an image capturing region with a wide angle of view that is equivalent to that of a fisheye lens.

Figure 3:
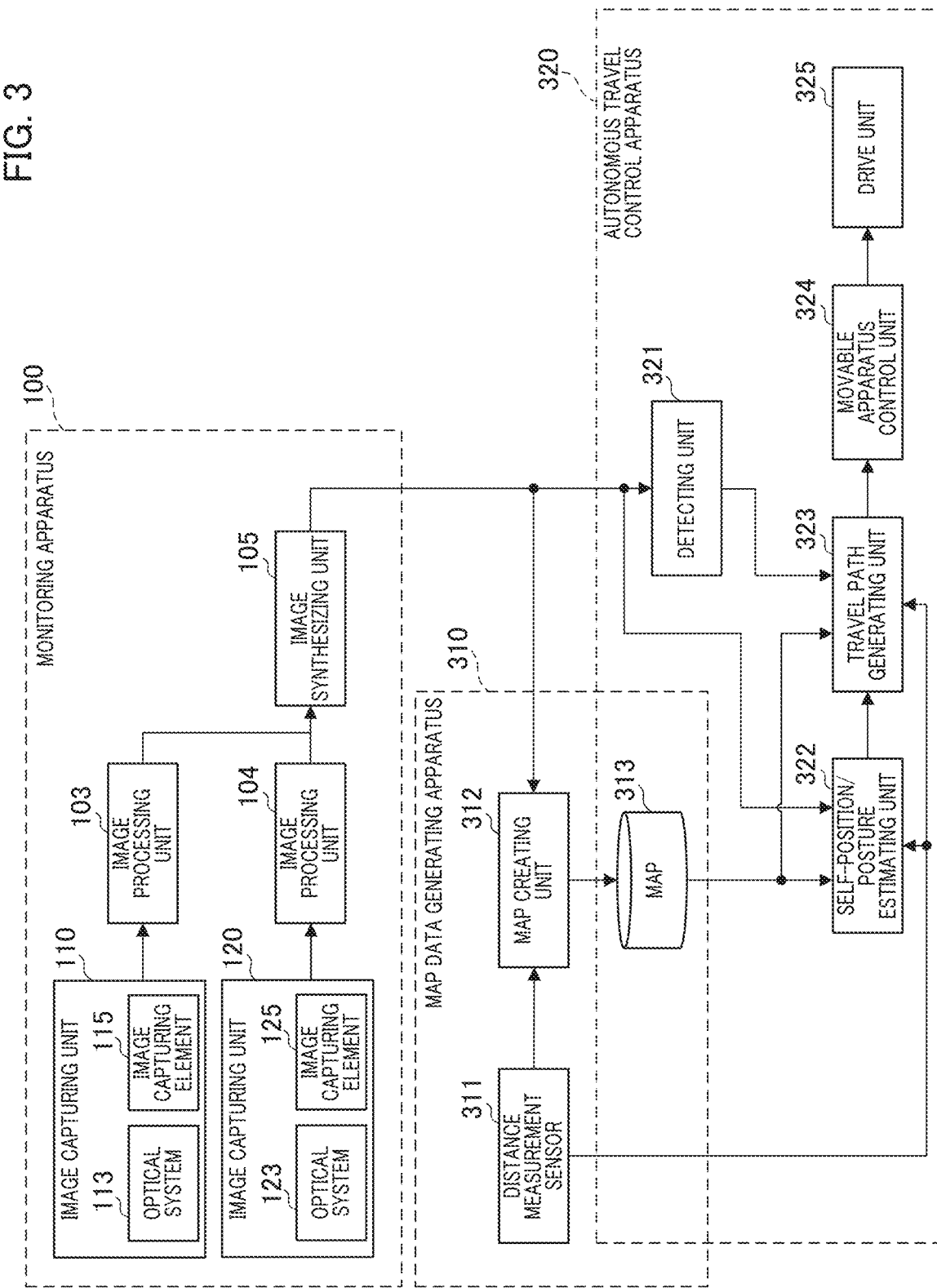
FIG. 3 is a diagram showing a functional configurational example of an autonomous travel system that has been built-into a movable apparatus.

FIG. 3 is a diagram showing a functional configurational example of an autonomous travel system that is built into a movable apparatus 1 according to the present embodiment. This autonomous travel system has a monitoring apparatus 100, a map data generating apparatus 310, and an autonomous travel control apparatus 320. The movable apparatus 1 has this autonomous travel system, and is able to perform autonomous travel.

The autonomous travel system is provided with an arithmetic unit such as a CPU or the like, and a storage unit such as a RAM, a ROM, a flash memory, a hard disk drive, or the like, to serve as hardware. The illustration of these hardware elements is omitted in the diagrams. From among these storage units, the ROM predominantly stores programs that are necessary in order for the movable apparatus 1 to perform autonomous travel, and the necessary data is predominantly stored on the flash memory or hard disk drive. In addition, there are also cases in which the autonomous travel system is provided with a communications apparatus that performs communications with external apparatuses. A PLD (programmable logic device), an ASIC (application specific integrated circuit), or the like may also be used instead of or in addition to the CPU. Conversely, a DSP (digital signal processor) may also be used. The operations of the monitoring apparatus may be controlled by the above-described CPU, or they may also be controlled by a controller that comprises a CPU, MPU or the like that has been provided separately from this CPU.

Note that in the autonomous travel system that is shown in FIG. 3, at least one block from among the blocks other than the image capturing unit 110, the image capturing unit 120, and a drive unit 325 may also be built into an apparatus that is separate from the movable apparatus 1 (a remote apparatus and server). In this case, the movable apparatus 1 and this remote apparatus and server may be configured such that they can primarily communicate with each other wirelessly.

The monitoring apparatus 100 has the image capturing unit 110, the image capturing unit 120, an image processing unit 103, an image processing unit 104, and an image synthesizing unit 105.

The image capturing unit 110 is provided with the optical system 113 and the image capturing element 115. In the same manner, the image capturing unit 120 is provided with the optical system 123, and the image capturing element 125.

As was explained above, the configurations of the image capturing unit 110 and the image capturing unit 120 are the same and therefore, an explanation will be given using the configuration of the image capturing unit 110 as an example. The optical system 113 is configured from one or more optical lenses, and has optical characteristics such as those shown in FIG. 2A and FIG. 2B. The optical system 113 forms (image forms) an optical image on the light receiving surface of the image capturing element 115.

The image capturing element 115 photoelectrically converts the optical image that has been formed and outputs an image capturing signal. A two-dimensional image sensor such as a CMOS (Complementary Metal Oxide Semiconductor) or the like is used as the image capturing element 115. Note that for example, R, G, and B color filters are arranged in a Bayer array per pixel on the light receiving surface of the image capturing element 115, and each R, G, and B pixel signal from the image capturing unit 10 is output in order to server as an image capturing signal.

The image processing unit 103 and the image processing unit 104 perform each type of image processing such as white balance adjustment, de-mosaic processing, gain/offset adjustment, gamma correction, and/or color correction on the image capturing signal that has been output from the image capturing unit 110 and the image capturing signal that has been output from the image capturing unit 120.

The image synthesizing unit 105 creates a synthesized image in which the captured images from the image capturing unit 110 and the image capturing unit 120 have been synthesized into one image after each has been plane expanded (panorama expanded). The method for the plane expansion may be a method based on equirectangular projection, or it may also be a method based on Mercator projection. The image synthesizing unit 105 functions as a synthesizing means primarily through cooperation with the CPU.

Figure 4A:
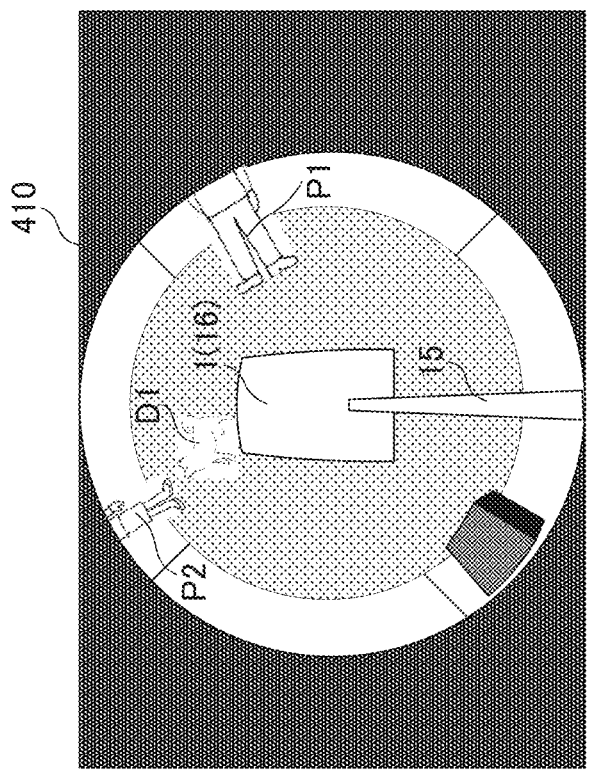
FIG. 4A and FIG. 4B are diagrams showing an example of a captured image from (the two image capturing units of) the monitoring apparatus.
Figure 4B:
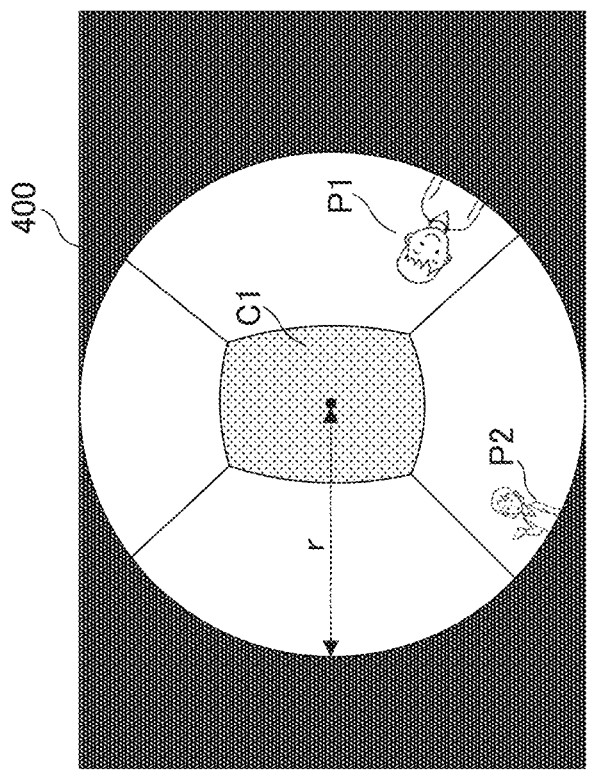

In this context, an image capturing example for the image capturing unit 110 and the image capturing unit 120 in the present embodiment will be explained using FIG. 4A and FIG. 4B. FIG. 4A is a diagram showing one example of an image 400 with a field of view in the upward direction of the monitoring apparatus 100 that has been image captured by the image capturing unit 110. FIG. 4B is a diagram showing one example of an image 410 with a field of view in the downward direction of the monitoring apparatus 100 that has been image captured by the image capturing unit 120.

In the present embodiment, an example is explained in which the movable apparatus 1 that the monitoring apparatus 100 has been built into exists inside of a building, and the image 400 and the image 410 have been captured of the space inside of the building. The image 400 and the image 410 are images that have been image formed by the image capturing element 115 and the image capturing element 125 according to the characteristics of the optical system 113 and the optical system 123 of the image capturing unit 110 and the image capturing unit 120 that were described above. For example, in the image 400 and the image 410, an image is formed in which a ceiling C1 and the movable apparatus 1 itself are in positions corresponding to the first region 21c that was explained in FIG. 2A. In contrast, an image is formed in which a person P1 and a person P2, who exist in peripheral positions in the horizontal direction of the movable apparatus 1, are in positions corresponding to the second region 21d. That is, in the captured image 400 and the captured image 410, the ceiling C1 and the body 16 of the movable apparatus 1 that exist in the upward direction of the monitoring apparatus 100 are image captured at a lower resolution than in a captured image for a case in which a fisheye lens, which has an equal distance projection characteristic, was used. In addition, objects that exist in the periphery in the horizontal direction of the monitoring apparatus 100 such as the person P1 and the person P2 are image captured at a higher resolution than in a captured image from a case in which a fisheye lens, which has an equal distance projection characteristic, was used.

In this context, conventionally, in a situation in which, for example, it is necessary to capture images of the horizontal direction of the movable apparatus at a high resolution, it becomes such that the entire surroundings, including the direction of the sky and the direction of the ground, in the captured images are captured at a high resolution by increasing the pixel number in the image capturing element, creating the problem that the data size for the image becomes large. In addition, in a case in which the step of increasing the number of cameras is taken in order to acquire a high resolution in the horizontal direction, this presents the problem that the size of the camera system will increase, or the cost thereof will increase.

In relation to this, in the present embodiment, the monitoring apparatus 100 is installed in the position that was explained using FIG. 1, and therefore, it is possible to perform image capturing at a low resolution for the region in the upward direction, in which objects that are not the primary image capturing subject, such as the sky, or the ceiling C1, exist. In addition, the monitoring apparatus 100 is able to capture images at a high resolution for the region in the side direction, in which objects that are the primary image capturing subjects, such as the person P1, and the person P2, exist. Therefore, the monitoring apparatus 100 is able to obtain captured images of the surroundings of the monitoring apparatus 100 with a good size efficiency without making the data size for the captured image larger than necessary. That is, it is possible to capture images of the targets of the image capturing in the image capturing angle of view, that is, of regions in directions that the objects that are the targets primarily exist in, at a higher resolution than other regions, and it is possible to increase the size efficiency and usage efficiency for the image capturing data. In addition, by using an optical system that has an ultrawide-angle viewing angle, the monitoring apparatus 100 captures images of objects even when these objects exist in regions with a low resolution, and it is thereby possible to recognize these objects.

Figure 5:
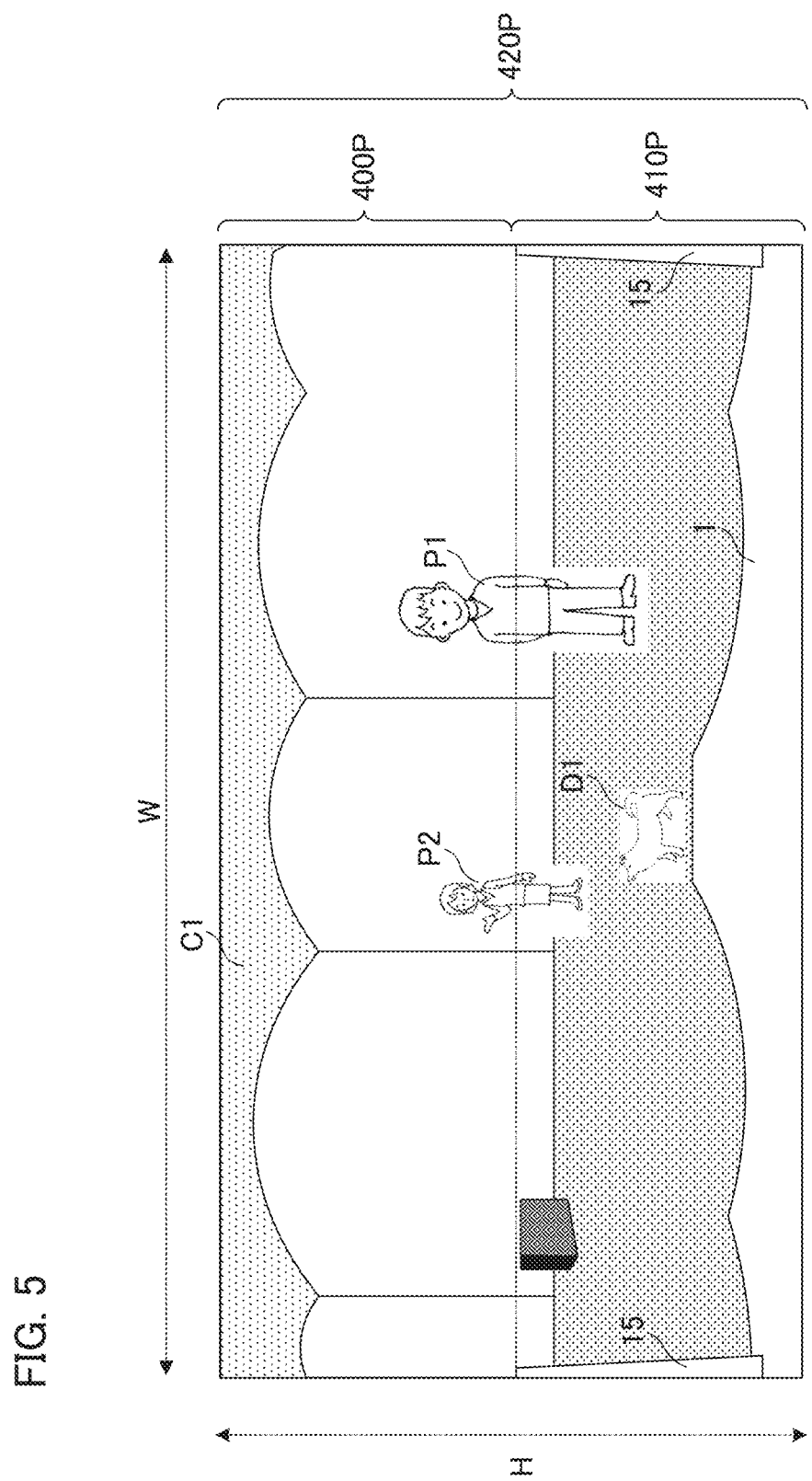
FIG. 5 is a diagram showing one example of a synthesized image created by an image synthesizing unit

Next, creation processing for a synthesized image by the image synthesizing unit 105 will be explained. FIG. 5 is a diagram showing one example of a synthesized image that is created by the image synthesizing unit 105. The image synthesizing unit 105 generates an image 400P and an image 410P in which the image 400 and the image 410 have been panorama expanded, and generates one image 420P that has been synthesized by placing these panorama expanded images on the top and bottom. Note that in a case in which this is panorama expanded based on equirectangular projection, the resolution W in the horizontal direction and the resolution H in the vertical direction of the image 420P may be determined such that W:H=2:1, which is an aspect ratio that is widely used in equirectangular projection. However, it is not the case that the aspect ratio is limited thereto.

Conversely, the resolution W in the horizontal direction and the resolution H in the vertical direction, and the image density in the vertical direction (the pixel number per unit angle of view in the vertical direction) of the image 420P may also be determined by the image synthesizing unit 105 based on the optical characteristics of the optical system 113 and the optical system 123, as will be explained below.

First, in a case in which the pixel number for the outer periphery of the image circle for the image 400 is made R, the resolution W in the horizontal direction of the image 420P is made W=R. In this case, the image is panorama expanded without approximately changing the pixel density of the image region that corresponds to the second region 21d, which is the high-resolution region in the image 400, and the image 410. Note that if the radius of the image circle for the image 400 is made r, the pixel number R for the outer periphery is R=2πr.

In addition, the image synthesizing unit 105 may also make it such that H=2r when the vertical resolution H for the image 420P has been made the pixel number for the radius r of the image circle for the image 400. The image synthesizing unit 105 may also change the pixel density in the vertical direction for the image 420P based on the projection characteristic of the optical system 113 and the optical system 115 for each image region without performing enlargement or reduction processing on the image in the vertical direction such that this pixel density becomes fixed. Specifically, a situation in which the relationship between the half angle of view θ and the image height y for the image 400 and the image 410 that are shown in FIG. 2B is maintained is preferable.

In the above manner, it is possible create a panorama image without performing enlargement or reduction in the upward direction on an image region that corresponds to the second region 21d, which is a high-resolution region in the image 400 and the image 410 by fixing the resolution H and the pixel density in the vertical direction for the image 420P.

In the above manner, the image synthesizing unit 105 generates the image 420P without enlarging the original image 400 or the original image 410, and it is thereby possible to reduce the processing load when an autonomous travel control apparatus 320 that will be described below uses the image 420P. In addition, the image synthesizing unit 105 generates the image 420P without enlarging the original image 400 or the original image 410, and it is thereby possible to obtain results in which the detection precision is not decreased when the autonomous travel control apparatus 320 to be described below performs object detection by using the image 420P.

Next, the configuration of the map data generating apparatus 310 will be explained with reference to FIG. 3. The map data generating apparatus 310 has a distance measurement sensor 311 and a map creating unit 312. The map creating unit 312 creates a map 313 that is necessary in self-position and posture estimations and path generation based on an image that is output from the image synthesizing unit 105 and at least one distance measurement value from the distance measurement sensor 311.

The map (map data) 313 is data that represents features of a structure such as, for example, objects that exist in the space, the floors and walls of a building, the ceiling, or the like. This data is three-dimensional space data such as three-dimensional point group data, coordinate data for feature points, and the like.

The map creating unit 312 is able to acquire information for a structure surrounding a movable apparatus 1 in a wide range and to acquire information for the structure in the horizontal direction with a high resolution by using the output image from the image synthesizing unit 105. Therefore, it is possible to further create the map 313 such that the horizontal direction, which is the direction of movement of the movable apparatus 1, is detailed, while including information for the entire surroundings of the movable apparatus 1. Note that the map data generating apparatus 310 is able to update the map 313 when necessary while the movable apparatus 1 is traveling.

Next, the configuration of the autonomous travel control apparatus 320 will be explained. The autonomous travel control apparatus 320 is an apparatus that is built into the movable apparatus 1 and drives the movable apparatus 1. The autonomous travel control apparatus 320 has a detecting unit 321, a self-position/posture estimating unit 322, a travel path generating unit 323, a movable apparatus control unit 324, and the drive unit 325.

The detecting unit 321 detects objects that exist in the surroundings of the movable apparatus 1 from an output image of the image synthesizing unit 105. Objects that are detection targets are objects that will become obstacles to the traveling of the movable apparatus 1, and the positions of these objects, or objects that are the goal location of the traveling and the positions of these objects, such as for example, a desk, a chair, or a person. The detecting unit 321 functions as a detection means primarily through cooperation with the CPU.

In addition, the detecting unit 321 detects instructions from the output image of the image synthesizing unit 105 based on a bodily movement (referred to below as a gesture) of the objects that exist in the surroundings of the movable apparatus 1.

In this context, an operational example for gesture detection by the detecting unit 321 will be explained. The detecting unit 321 holds in advance information relating to a plurality of gestures and motion instructions that are linked therewith (correspond thereto). In addition, the detecting unit 321 determines if a gesture for a person that has been detected from an output image of the image synthesizing unit 105 matches the gesture information that is recorded in advance in a recording unit (storage unit), which is not shown. For example, upon detecting a gesture movement in which a person raises the palm of their hand upward and is temporarily still, the detecting unit 321 determines that an instruction has been received to face the location of this person. In addition, upon detecting a gesture movement in which a person faces the palm of their hand towards the movable apparatus 2 and is temporarily still, the detecting unit 321 determines that an instruction has been received to halt traveling.

The detecting unit 321 may also be provided with a function that detects specific objects or people from an output image of the image synthesizing unit 105. For example, upon detecting a person, the detecting unit 321 is able to specify this person by referring to person data that is recorded in advance in the recording unit, which is not shown. The detecting unit 321 may also be made to operate such that it only detects instructions based on gestures from a specific person.

Note that in order for a person to control the movable apparatus 1 using a gesture, the detecting unit 321 detects this person's gestures even if the person is in a position in a direction that is 360° in the lateral direction from the movable apparatus 1, or even if the person is in a position that is far away from the movable apparatus 1. For example, the persons who become the target of the gesture detection in the image 420P that was explained in FIG. 5 include the person P2 who is far away, not just the person P1, who is at a relatively close position to the movable apparatus 1.

The self-position/posture estimating unit 322 uses the output image from the image synthesizing unit 105, the distance measurement value from the distance measurement sensor 311, and the map 313 and estimates the position and posture of the movable apparatus 1 with the built-in autonomous travel control apparatus 320 while the movable apparatus 1 is moving. The self-position/posture estimating unit 322 for example, extracts features of the structure surrounding the movable apparatus 1 from the output image from the image synthesizing unit 105 and the distance measurement value from the distance measurement sensor 311, and performs self-position estimation by comparing this with the map 313.

The self-position/posture estimating unit 322 is able to acquire information for structures and the like surrounding the movable apparatus 1 with a wide range and to acquire information for structures and the like in the horizontal direction with a high resolution by using the output image from the image synthesizing unit 105. Therefore, it is possible to acquire the detailed features of the structure surrounding the movable apparatus 1 with a high efficiency while suppressing the processing load, and it is possible to increase the precision of the self-position estimation.

The travel path generating unit 323 generates a travel path based on the distance measurement value from the distance measurement sensor 311, the self-position/posture estimation results from the self-position/posture estimating unit 322, the map 313, and the detection results from the detecting unit 321.

In this context, one example of the operations of the travel path generating unit 323 will be explained with reference to FIG. 5. For example, the travel path generating unit 323 sets the travel destination as the person P2 in a case in which the detecting unit 321 has detected a gesture in which the person P2, who exists in the surroundings of the movable apparatus 1, has called the movable apparatus 1. Then, the travel path is generated based on the distance measurement value from the distance measurement sensor 311, the self-position/posture estimation results, and the map 313.

The travel path generating unit 323 also updates the travel path while the movable apparatus 1 is moving. In a case in which the detecting unit 321 has detected a different movable apparatus that exists in the surroundings of the movable apparatus 1, the travel path generating unit 323 determines the possibility of collision with this object, and in a case in which it has determined that there is a possibility of collision, re-generates the travel path so as to avoid collision. For example, in a case in which an animal D1 has entered the path towards the person P2, who is the destination, a path will be re-generated so as to move towards the person P2 while avoiding the animal D1.

The movable apparatus control unit 324 controls the movement direction of the movable apparatus 1 with the built-in autonomous travel control apparatus 320 based on the travel path that has been generated by the travel path generating unit 323. The drive unit 325 drives the wheels or the like of the movable apparatus 1 with the built-in autonomous travel control apparatus 320.

Note that the map 313 is configured such that it can be accessed from both the map data generating apparatus 310 and the autonomous travel control apparatus 320. Either the map data generating apparatus 310 or the autonomous travel control apparatus 320 may hold the map 313, or both may also hold the map 313.

As was explained above, the movable apparatus 1 with a built-in autonomous travel system comprising the monitoring apparatus 100 of the present embodiment performs autonomous travel based on an image that has been captured of the surroundings of the movable apparatus 1 with a wide range and that has captured the horizontal peripheral direction with a high resolution, which was acquired by the monitoring apparatus 100. Therefore, the movable apparatus 1 is able to monitor a wide range such as its own feet or the like and correct its travel path. In addition, the movable apparatus 1 is able to recognize objects such as humans, structures, and the like that exist around itself with a high degree of precision. Therefore, it becomes easy to detect objects and the like that exist far away, and it is possible to quickly create a destination for the travel path. In addition, it becomes possible to recognize small gestures such as the movement and direction of a person's fingers for a person who exists in the surroundings of the movable apparatus 1.

Until this point an example has been given for a configuration in which an image is output that has been synthesized by the image synthesizing unit 105, which the monitoring apparatus 100 is provided with, panorama expanding captured images from the image capturing unit 110 and the image capturing unit 120 (captured image 400, and captured image 410). However, the present disclosure is not limited thereto.

As another configurational example, the monitoring apparatus may also be a configuration that is not provided with an image synthesizing unit 105, and that outputs the captured images from both the image capturing unit 110 and the image capturing unit 120 (image 400, and image 410). In this case, this may also be a configuration in which the image synthesizing unit 105 is provided inside of the autonomous travel control apparatus 320.

In a case in which the image synthesizing unit 105 has not been provided, the detecting unit 321 inside of the autonomous travel control apparatus 320 may also be configured so as to detect objects that are detection targets that exist in the surroundings of the movable apparatus 1 from captured images (image 400, and image 410) from the image capturing unit 110 and the image capturing unit 120. In the optical system 113 of the image capturing unit 110 and the optical system 123 of the image capturing unit 120 of the present embodiment, as was explained above, it is possible to capture images of the region in the horizontal direction from the second angle of view 10b with a higher resolution than for the region in the direction of the sky or the ground by the first angle of view 10a. Therefore, it is possible to have a configuration in which surrounding objects are detected by the detecting unit 321 without adjusting distortion or the aspect ratio in these captured images that occur due to the panorama expansion of the captured images, and it is possible to reduce the processing time and the energy associated with panorama expansion processing.

(Other Embodiments)

Below, other embodiments will be explained.

In the present embodiment, the image capturing unit 110 and the image capturing unit 120 have been installed on the movable apparatus 1 such that the optical axes of these both point in the upward direction (the direction of the sky, the ceiling, or the like), and the downward direction (the ground, the direction of the ground, or the like). However, the present disclosure may also have a configuration in which the image capturing unit 110 and the image capturing unit 120 are installed on the movable apparatus 1 such that their optical axes point in opposite directions to one another at an angle of view in the movement direction of the movable apparatus 1 or at an angle of view that is close to this movement direction. In this case, the movable apparatus 1 is able to travel through, for example, a pipe or a tunnel while the monitoring apparatus captures images of the inner walls or the like of this pipe or tunnel.

The goal of the image capturing in the present embodiment is, for example, surveying, inspecting, or monitoring these internal walls, or the like. An object that becomes a subject of the image capturing at a high resolution by the second region 21d (FIG. 2A), is for example, a state of the wall or road surface (scratches, cracks, coloring, bumps on the surface, foreign bodies). In the case of the present embodiment, it is preferable if the monitoring apparatus 100, which has the image capturing unit 110 and the image capturing unit 120, has been installed so as to be in front of and behind the body 16 of the movable apparatus 1 such that the body 16 of the movable apparatus 1 does not enter into the image capturing angle of view in the downward direction.

A monitoring apparatus according to such a mode as was described above is able to capture images of a region in which an object that is the primary image capturing subject exists, such as an inner wall, a travel path or the like, at a high resolution. It is thereby possible for the monitoring apparatus to capture images at a high resolution of regions in the direction in which the object that will become the image capturing subject primarily exits within the image capturing angle of view.

As a further separate embodiment, the optical axis of the optical system 113 of the image capturing unit 110 and the optical axis of the optical system 123 of the image capturing unit 120 are not limited to a mode in which they exist on the same straight line, and they may also be out of alignment with each other within a predetermined distance range.

It may also be made such that in order to realize a portion or the entirety of the control in the present embodiment a computer program that realizes the functions of the above-described embodiments is provided to the monitoring apparatus or the like via a network or each type of storage medium. In addition, the computer (or CPU, MPU, or the like) in this monitoring apparatus or the like may also be made so as to read out and execute this program. In this case, it becomes such that this program and the storage medium on which this program has been stored configured the present disclosure.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-122327, filed Jul. 27, 2023, which is hereby incorporated by reference herein in its entirety.

What is claimed is:

1. A monitoring apparatus comprising:
a first image capturing unit and a second image capturing unit, wherein
each of the first image capturing unit and the second image capturing unit comprises:
an image capturing element; and
an optical system configured to form an optical image on a light receiving surface of the image capturing element at an ultrawide-angle viewing angle in which a resolution of a second region that is on an outer peripheral side of a first region is higher in comparison to a resolution of the first region that includes a center through which an optical axis passes,
wherein the first image capturing unit and the second image capturing unit are disposed such that directions of the optical axes of the optical systems are opposite to each other, and
wherein in a case in which an image height of each of the optical systems is made y, a focal point distance is made f, and a half angle of view is made θ, a projection characteristic y(θ) fulfills $0.2 < 2 \times f \times \tan(\theta_{max}/2)/y(\theta_{max}) < 0.92$.

2. The monitoring apparatus according to claim 1, wherein, the viewing angle of each of the optical systems is equal to or greater than 180°.

3. The monitoring apparatus according to claim 1, wherein the optical axis of the optical system of the first image capturing unit and the optical axis of the optical system of the second image capturing unit are disposed on the same straight line.

4. The monitoring apparatus according to claim 1, wherein
the first image capturing unit is installed in a first position such that the optical axis of the first image capturing unit points in an upward direction; and
the second image capturing unit is installed in a second position that is adjacent to a height of the first position such that the optical axis of the second image capturing unit points in a downward direction.

5. The monitoring apparatus according to claim 1, wherein in at least one of the first region and the second region of both of the optical systems, the resolution becomes higher from a center side through which the optical axis passes towards an outer peripheral side.

6. The monitoring apparatus according to claim 1, further comprising at least one processor or circuit configured to function as a synthesizing unit configured to create one synthesized image by panorama expanding and synthesizing each captured image from the first image capturing unit and the second image capturing unit, wherein
the synthesizing unit determines a pixel density in a vertical direction of the synthesized image according to optical properties of each of the optical systems.

7. A movable apparatus including a monitoring apparatus, wherein
the monitoring apparatus comprises: a first image capturing unit and a second image capturing unit; and
each of the first image capturing unit and the second image capturing unit comprise:
an image capturing element; and
an optical system configured to form an optical image on a light receiving surface of the image capturing element at an ultrawide-angle viewing angle in which a resolution of a second region that is on an outer peripheral side of a first region is higher in comparison to a resolution of the first region that includes a center through which an optical axis passes,
wherein the first image capturing unit and the second image capturing unit are disposed such that directions of the optical axes of the optical systems are opposite to each other, and
wherein the first image capturing unit is installed in a first position such that the optical axis of the first image capturing unit points in an upward direction, and
wherein the second image capturing unit is installed in a second position that is adjacent to a height of the first position such that the optical axis of the second image capturing unit points in a downward direction.

8. The movable apparatus according to claim 7, further comprising at least one processor or circuit configured to function as a detecting unit configured to detect an object that exists in surroundings of the movable apparatus based on each captured image of the first image capturing unit and the second image capturing unit.

9. The movable apparatus according to claim 8, wherein the detecting unit detects a motion instruction to the movable apparatus corresponding to a bodily movement of a person who exists in surroundings of the movable apparatus.

10. A method for installing a monitoring apparatus, the method comprising:
  installing a first image capturing unit from among the first image capturing unit and a second image capturing unit in a first position, wherein each of the first image capturing unit and the second image capturing unit comprise an image capturing element, and an optical system configured to form an optical image on a light receiving surface of the image capturing element at an ultrawide-angle viewing angle in which a resolution of a second region that is on an outer peripheral side of a first region is higher in comparison to a resolution of the first region that includes a center through which an optical axis passes; and
  installing the second image capturing unit in a second position that is adjacent to the first position such that directions of the optical axes of the optical systems of the first image capturing unit and the second image capturing unit are opposite to each other,
  wherein in a case in which an image height of each of the optical systems is made y, a focal point distance is made f, and a half angle of view is made θ, a projection characteristic y(θ) fulfills $0.2 < 2 \times f \times \tan(\theta_{max}/2)/y(\theta_{max}) < 0.92$.

11. A monitoring apparatus comprising:
  a first image capturing unit and a second image capturing unit, wherein
  each of the first image capturing unit and the second image capturing unit comprises:
    an image capturing element; and
    an optical system configured to form an optical image on a light receiving surface of the image capturing element at an ultrawide-angle viewing angle in which a resolution of a second region that is on an outer peripheral side of a first region is higher in comparison to a resolution of the first region that includes a center through which an optical axis passes,
  wherein the first image capturing unit and the second image capturing unit are disposed such that directions of the optical axes of the optical systems are opposite to each other, and
  wherein the first image capturing unit is installed in a first position such that the optical axis of the first image capturing unit points in an upward direction, and
  wherein the second image capturing unit is installed in a second position that is adjacent to a height of the first position such that the optical axis of the second image capturing unit points in a downward direction.

12. A method for installing a monitoring apparatus, the method comprising:
  installing a first image capturing unit from among the first image capturing unit and a second image capturing unit in a first position, wherein each of the first image capturing unit and the second image capturing unit comprise an image capturing element, and an optical system configured to form an optical image on a light receiving surface of the image capturing element at an ultrawide-angle viewing angle in which a resolution of a second region that is on an outer peripheral side of a first region is higher in comparison to a resolution of the first region that includes a center through which an optical axis passes; and
  installing the second image capturing unit in a second position that is adjacent to the first position such that directions of the optical axes of the optical systems of the first image capturing unit and the second image capturing unit are opposite to each other,
  wherein the first image capturing unit is installed in a first position such that the optical axis of the first image capturing unit points in an upward direction, and
  wherein the second image capturing unit is installed in a second position that is adjacent to a height of the first position such that the optical axis of the second image capturing unit points in a downward direction.

* * * * *